Dec. 14, 1937.  W. W. BENNER ET AL  2,102,453
AUTOMATIC STOCK TAKE-OFF MACHINE
Filed May 28, 1935  6 Sheets-Sheet 2

Inventor
W. W. Benner
F. Leopold, Jr.
By
Attorney

Dec. 14, 1937.  W. W. BENNER ET AL  2,102,453
AUTOMATIC STOCK TAKE-OFF MACHINE
Filed May 28, 1935  6 Sheets-Sheet 4

Inventor:
W. W. BENNER
F. LEOPOLD, JR.
By Leo Edelson
Attorney.

Dec. 14, 1937.                W. W. BENNER ET AL                    2,102,453
                      AUTOMATIC STOCK TAKE-OFF MACHINE
                           Filed May 28, 1935            6 Sheets-Sheet 5

Inventor
W. W. BENNER
F. LEOPOLD, JR.
By
Attorney.

Dec. 14, 1937. W. W. BENNER ET AL 2,102,453
AUTOMATIC STOCK TAKE-OFF MACHINE
Filed May 28, 1935 6 Sheets-Sheet 6

Fig. 6

Inventor
W. W. BENNER
F. LEOPOLD, JR
by Leon Edelson
Attorney

Patented Dec. 14, 1937

2,102,453

UNITED STATES PATENT OFFICE 2,102,453

AUTOMATIC STOCK TAKE-OFF MACHINE

Winthrop W. Benner, Ithan, and Frederick Leopold, Jr., Harmonville, Pa., assignors to Lee Rubber & Tire Corporation, Conshohocken, Pa., a corporation of New York Application May 28, 1935, Serial No. 23,862

10 Claims. (Cl. 271—2.2)

This invention relates generally to material handling apparatus and more particularly to an improved apparatus for facilitating the removal of slabs of rubber and the like from a continuously operating mixing mill.

In the fabrication of rubber stock and the like, the rubber compound is prepared in what is generally known as a mixing mill in which a pair of drums or rolls are employed through which a batch of the rubber compound is repeatedly fed sufficiently to "knead" the rubber compound into its requisite mixed condition. The rubber stock so fed through the rolls of the mixing mill is permitted to adhere to the surface of the forward roll in the form of a layer the thickness of which is determined by the bight of the mixing mill rolls. Upon completion of the mixing operation, it has been the conventional practice heretofore and prior to the present invention for the operator to manually remove from the surface of the forward roll of the mixing mill a slab of the compounded rubber stock, this being accomplished by slitting the stock first in a direction longitudinally of the roll and then circumferentially thereof to permit a slab of a predetermined width and length to be peeled from the surface of the roll. This slab, which is ordinarily approximately 2½ feet wide and 6 feet long, is of a weight requiring considerable effort to handle and when it is realized that from ten to fourteen such slabs are obtained from each batch of rubber compound mixed in the mill, it will be evident that a very considerable amount of laborious work is entailed not only in removing the slabs from the mill but also in their subsequent handling, which latter includes dipping each slab into a suitable surface-coating solution or emulsion preliminarily to suspending it upon a rack to cool off. It will be understood further that in this conventional method of manually stripping the rubber stock from the mixing mill roll, there is necessarily involved a certain time delay between the removal of the several successive slabs in consequence of which the rubber of the slabs which are first removed is subjected to considerably less mixing than is the rubber of the slabs last removed. This variation in the duration of mix of different portions of the same batch of rubber stock prevented to large extent securing a uniformly mixed stock.

Moreover, in the manual handling of the rubber stock it has been necessary to remove the stock from the mill in the form of relatively thick slabs, generally not less than three-sixteenths of an inch in thickness, in order to insure complete removal of the entire batch of stock from the mill within a reasonably short period of time. Also, in order to effect the necessary cooling of the stock, it has been the general practice to suspend the separately removed slabs in such spaced relation as to permit air to circulate freely therebetween, but due to the comparatively great weight and thickness of the slabs it has been a laborious task to suspend the slabs in proper spaced condition and even when so suspended the cooling period has been unduly prolonged because the thick slabs retain their heat over a considerable period of time.

It is among the principal objects of the present invention to avoid the aforementioned objections and difficulties by the provision of an apparatus which is operative to automatically perform the operations of removing and subsequently handling the rubber stock. Not only is the stock stripped from the revolving surface of the forward roll of the mixing mill in the form of a continuous strip, but it is also automatically conveyed from the mill through a coating bath and thence delivered to a carriage from which it is suspended in the form of a festooned strip. By means of this apparatus, the laborious work of separately removing from the mixing mill individual slabs of the rubber stock, then dipping each such slab in the soapstone mixture and finally suspending each slab in position to permit its being cooled, is substantially eliminated.

Moreover, the provision of an apparatus constructed in accordance with and embodying the principles of the present invention very materially increases the speed with which the stock may be removed from the mill, in consequence of which the entire batch of the stock is of a more uniformly mixed character than has been obtainable heretofore, it being among the principal objects of the present invention to produce a greater uniformity of mix of the compounded stock.

Further, by the use of the stock take-off apparatus of the present invention, the thickness of the stock removed from the mill may be very materially reduced, as, for example, to three-thirty-seconds of an inch or less, in consequence of which the stock cools in a relatively short period of time, this cooling operation being further hastened by reason of the fact that the stock which is removed from the mill by the present apparatus is festooned by the latter in such manner that successive sections of the stock are suspended in spaced, parallel relation to permit the free circulation of air therebetween.

Still another and important object of the present invention is to so reduce the time involved in removing the entire batch of the stock from the mixing mill that no portion thereof is subjected to so much greater mixing than any other portion thereof as to introduce any material variations in the stock obtained from a single batch of rubber mixed in the mill, thereby measurably increasing the production capacity of the mill at the same time that the power required for operating the latter is considerably decreased.

A still further object of the invention is the provision of an apparatus which is operative to automatically remove the stock from the mixing mill and subsequently deliver it to a point removed from the mill proper and in a condition enabling it to be handled expeditiously and by relatively unskilled labor.

Still another object of the present invention is the provision of means for removing from the mixing mill the entire batch of rubber mixed therein in the form of a single continuous strip, the said strip being suspended in festooned condition upon a movable carriage which is adapted to be shifted to a point sufficiently removed from the mixing mill to permit the stock suspended therefrom to cool off, all without interfering with the subsequent operation of the mixing mill to produce another and similar continuous strip of rubber stock obtained from a newly mixed batch of rubber.

Other objects of the present invention and advantages resulting from the operation of an apparatus constructed in accordance therewith will appear more fully hereinafter.

The invention consists substantially in the combination, construction, arrangement and relative location of parts, all as will appear more fully hereinafter, as shown in the accompanying drawings, and as finally pointed out in the appended claims.

In the accompanying drawings, which illustrate and exemplify certain preferred embodiments of the present invention.

Referring now to the drawings and more particularly to Figures 1 to 4 thereof, it will be observed that the apparatus of the present invention is shown operatively positioned with respect to a mixing mill 10 of the type well-known in the rubber industry and which includes a pair of power-driven rolls between which the rubber compound is continuously mixed or "kneaded" until the compound is in its requisite mixed condition. By suitably governing the relative speeds of the mixing mill rolls and through the use of other devices which are not deemed necessary to describe in this application, the rubber compound as mixed in the mill is caused to adhere to the surface of the forward roll 11 in the form of a circumferentially continuous layer of a width substantially equal to that of the roll and of a depth or thickness determined by the bight of the cooperating mixing rolls. The rubber stock so adhering to the surface of the roll 11 is designated generally by the reference numeral 12 in Figure 1 and it is this stock which the apparatus of the present invention is designed to remove in the form of a continuous strip.

Essentially, this apparatus comprises what may be considered as three separate and distinct units, namely, a combined take-off and conveying unit 13 for initially stripping and delivering the stock from the surface of the mill roll 11; an intermediate unit 14 which includes a conveyor upon which the stripped stock is received and which feeds it through a soapstone emulsion bath and thence to a point where it is discharged for subsequent festooning; and a movable carriage 15 suspended upon an overhead track and adapted for operative association with the intermediate stock-feeding unit to support the stock in festooned condition during the cooling period.

Figures 1, 10:
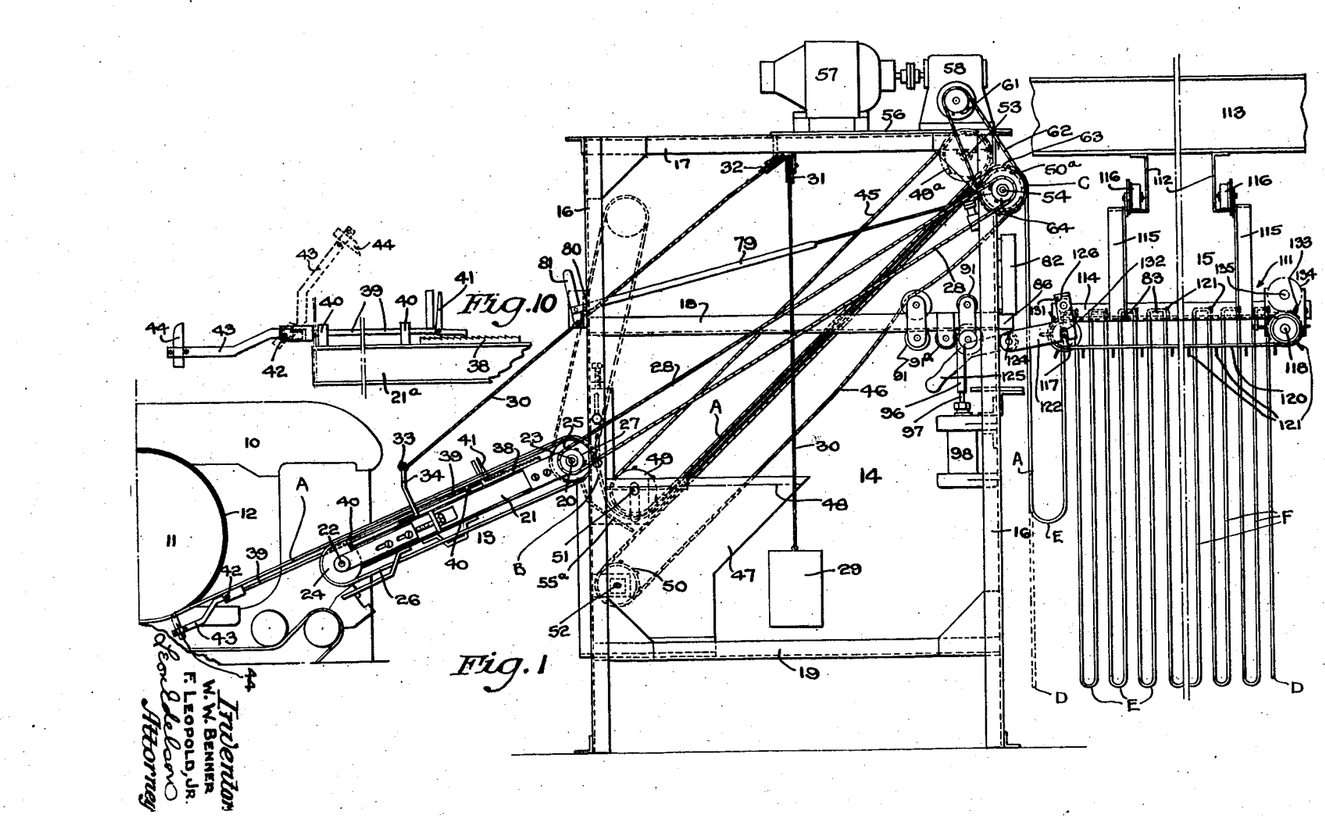
Figure 1 is a side elevational view of a machine constructed in accordance with and embodying the principles of the present invention, this view showing the stock feeding and conveying unit in operatively associated relation to the unit upon which the stock is suspended in festooned condition.
Figure 10 is a side elevational view showing the knife bar operatively associated with the stock take-off belt of the conveyor unit.

As appears most clearly in Figure 1 the intermediate unit 14 includes a skeleton frame-work the vertical uprights 16 of which are securely founded upon the floor surface immediately in advance of the mixing mill 10. Interconnecting and bracing the uprights 16 of the skeleton frame at each side thereof are a plurality of horizontally extending frame members 17, 18 and 19 and if desired additional frame members may be employed at the front and rear sides of the skeleton frame to interconnect and brace the uprights 16 thereof. It will be understood, of course, that any desired construction of skeleton frame may be employed, the primary requisites thereof being rigidity, strength and an openwork construction such as will not interfere with the free travel of the continuous strip of stock through the apparatus.

The forward unit 13 of the apparatus is adapted to extend forwardly of the intermediate unit 14 and toward the mixing mill 10, as most clearly appears in Figure 1, and to this end it is pivotally secured, as at 20, upon the forward side of the skeleton frame of the intermediate unit. This unit 13 comprises a pair of side rail members 21—21a the fore and rear ends of which are respectively interconnected by suitably journaled shafts 22 and 23. These shafts 22 and 23 are respectively provided with rollers 24 and 25 over which extends an endless belt 26. The rear shaft 23 of the belt conveyor unit 13 projects well beyond either side of the unit for projection through suitable journals 26'—26' respectively secured to the forward uprights of the skeleton frame of the intermediate unit 14. Secured to one free extremity of the shaft 23 is a sprocket wheel 27 which is engageable by a sprocket chain 28 for effecting rotation of the shaft 23 and so driving the endless conveyor belt 26. The conveyor belt unit 13 is normally counter-balanced by a counterweight 29 which is freely suspended upon one side of the skeleton frame and secured to one end of a cable 30 running over suitably disposed pulleys 31 and 32, the opposite ends of this cable being secured, as at 33, to a transversely extending yoke member 34 or the like suitably fixed to the conveyor belt frame in straddling relation to the belt 26. It will be observed that the belt conveyor unit 13 is so disposed relatively to the mixing mill that the side edge 35 of the belt 26 lies substantially in the vertical plane of the end 36 of the forward roll 11 of the mixing mill (see more particularly Figure 2).

Figure 9:
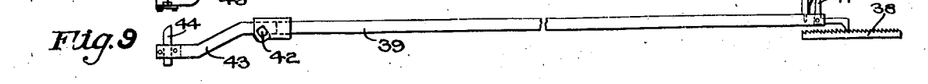

Suitably mounted upon the side rail member 21a of the conveyor belt unit 13 is a knife assembly, designated generally by the reference numeral 37. This assembly includes a relatively fixed ratchet bar 38 with which is operatively associated a longitudinally adjustable knife bar 39, the latter being guided in its longitudinal movement by suitably fixed guides 40—40. The rear end of the knife bar 39 has pivotally secured thereto a spring pressed detent 41 which is engageable with the ratchet bar 38 to maintain the knife bar in a predeterminedly adjusted position with respect to the belt conveyor unit 13. The forward end of the knife bar 39 has pivotally secured thereto, as at 42, a knife holder 43 within the free extremity of which is removably secured a knife 44. It will be observed as most clearly appears in Figures 8, 9 and 10 that the knife holder 43 is adapted to be swung upwardly about its pivot 42 and into the angular position shown by the dotted lines of Figure 10. in which position the knife holder is self-sustained by its own weight. This breaking of the knife mechanism at the pivotal point 42 is desired in order to effect disengagement of the knife from the roll, this being accomplished by the simple expedient of depressing the belt conveyor unit 13 downwardly sufficiently to clear the knife 44 from the roll 11 and permit the knife holder 43 to be swung about the pivot 42 into the dotted line position shown in Figure 10. It will be understood, of course, that in this operation of clearing the knife 44 from the roll, the knife mechanism may be bodily shifted rearwardly to its rearmost limit to provide increased clearance for the knife holder when the latter is swung upwardly about its pivot.

The pivotal connection between the knife bar 39 and the knife holder 43 is also desirable in order to reduce the overall length of the belt conveyor unit 13 when the latter is swung into its inoperative position as represented by the dotted lines of Figure 1, thereby assuring non-interference of the belt conveyor unit by the skeleton frame of the intermediate unit 14 when the belt conveyor unit is swung into its said inoperative position. It will be noted, however, that the connection between the knife bar 39 and the knife holder 43 is such that the rotation of the latter about its pivot in a counter-clockwise direction is limited to the full-line position shown in Figures 9 and 10.

As appears most clearly in Figure 1, the belt conveyor unit 13, when in its operative position, is depressed so that it is inclined forwardly and downwardly into a position such that the upper surface of the belt conveyor 26 thereof lies in a plane substantially tangential with the surface of the forward roll 11 of the mixing mill. With the belt conveyor in this position, the knife bar 39 is adjusted longitudinally to position the knife 44 beneath the roll 11 in such manner that as said roll rotates the knife severs the stock 12 along a circumferentially extending line. This line is normally spaced from the end 36 of the roll a distance substantially equal to the width of the belt conveyor 26, in consequence of which the stock which is stripped from the surface of the mill roll 11 is of a predeterminedly fixed, substantially uniform width. It will be understood, of course, that the knife 44 bears against the surface of the roll 11 with sufficient pressure to effect a complete severance of the stock along the circumferentially extending line aforesaid, this being effected by means of the counterweight 29 which tends constantly to lift the conveyor unit upwardly about its journaled shaft 23.

Referring now more particularly to the intermediate unit 14, it will be observed that in one form thereof it includes a pair of superimposed vertically inclined chain-type conveyors 45 and 46 between which the stock is fed and delivered along a vertically inclined path toward the upper rear end of the said intermediate unit. Mounted within the skeleton frame of the intermediate unit 14 at the point immediately adjacent and beneath the rear end of the belt conveyor unit 13 is a tank 47 within which is contained a mixture of soapstone and water or any other desired solution or emulsion for coating the surfaces of the stock stripped from the mill roll. This tank 47 is of a width somewhat greater than that of the belt conveyor 26 and it is so disposed with respect to the latter that strips of stock may be freely fed by the belt 26 into and through and thence out of the mixture contained in the tank. The normal level of the solution contained in the tank is indicated in Figure 1 by the line 48. In the particular form of the apparatus shown in Figures 1, 2, 3 and 4, it will be observed that the stock-feeding chains 45 and 46 respectively travel over sets of sprocket wheels 49—49a and 50—50a. The forward sprockets 49 and 50 are respectively journaled upon suitable shafts 51 and 52 extending transversely across the skeleton frame of the intermediate unit beneath the horizontal plane of the upper end of the solution tank 47. The upper sprockets 49a and 50a are respectively journaled upon shafts 53 and 54 extending transversely of the skeleton frame adjacent the upper rear end thereof. Preferably, the chain drives 45 and 46 are respectively arranged in sets each composed of a plurality of similar endless chains, each of these endless chains being provided with its own set of sprockets. The several chains of the upper set 45 thereof are respectively in vertical alignment with the several chains of the lower set 46 thereof and each chain is further characterized in that it is provided with a plurality of longitudinally spaced stock-engaging plates 55 or the like (see Figure 2), each of which projects to either side of its own chain to thereby provide for an increased stock-engaging surface. By providing cooperating sets of stock-feeding chains of the multiple character disclosed, a highly flexible chain drive is provided for the stock. As appears most clearly in Figure 1, the multiple sets of endless chains are so arranged relatively to each other that proximate sections thereof travel in substantially parallel planes and in such intimate association as to feed the stock therebetween in a substantially flat plane inclined upwardly and rearwardly from the solution tank 47. In order to positively guide the stock from the belt conveyor onto the drive chains 46, there is preferably provided a stock guide plate 55a which extends transversely across the tank 47 and is relatively so fixed in position as to insure against the stock not being properly received by the drive chain 46.

Mounted upon the top of the skeleton frame of the intermediate unit 14, preferably to one side and adjacent the rear end thereof is a plate or platform 56 upon which is supported a motor 57 and a gear reduction unit 58, the latter being direct-connected to the motor by the shaft 59. The gear reduction unit 58 is provided with a laterally extending driven shaft 60 to the outer end of which is suitably fixed a sprocket wheel 61. A sprocket drive chain 62 operatively connects the sprocket wheel 61 to a sprocket wheel 63 keyed to one end of the chain-drive shaft 54. Keyed to the same shaft 54 in spaced relation to the sprocket wheel 63 is a second sprocket wheel 64, which latter is adapted to be directly connected to the sprocket wheel 27 of the belt conveyor unit shaft 23 by the sprocket chain 28. As appears most clearly in Figures 1, 2 and 3, the upper shafts 53 and 54 of the flexible chain conveyor are respectively provided with inter-engaging gears 65 and 66, similar pairs of these gears being arranged at either side of the said chain conveyor. By so providing these inter-engaging gears 65 and 66 there is assured a positive drive of both sets of the chains 45 and 46 at substantially the same rate of speed.

It will be observed from the foregoing that the motor 57, through its gear box 58 and the chain drives 62 and 28, effects a simultaneous operation of the forward conveyor belt 26 and the cooperating sets of delivery chains 45 and 46. At this point, it may be observed that by the proper selection of different size sprocket wheels 63 and 64 the speed relation between the conveyor belt 26 and the feed chains 45 and 46 may be varied as desired. In the particular instance illustrated, the diameters of the sprocket wheels 63 and 64 are of such relative diameters that the speed of the conveyor belt 26 is approximately eight per cent. greater than the speed of the cooperating sets of delivery chains 45 and 46. The necessity for this difference in linear speeds of the conveyor belt and of the delivery chains will become apparent hereinafter.

Figures 5, 8:
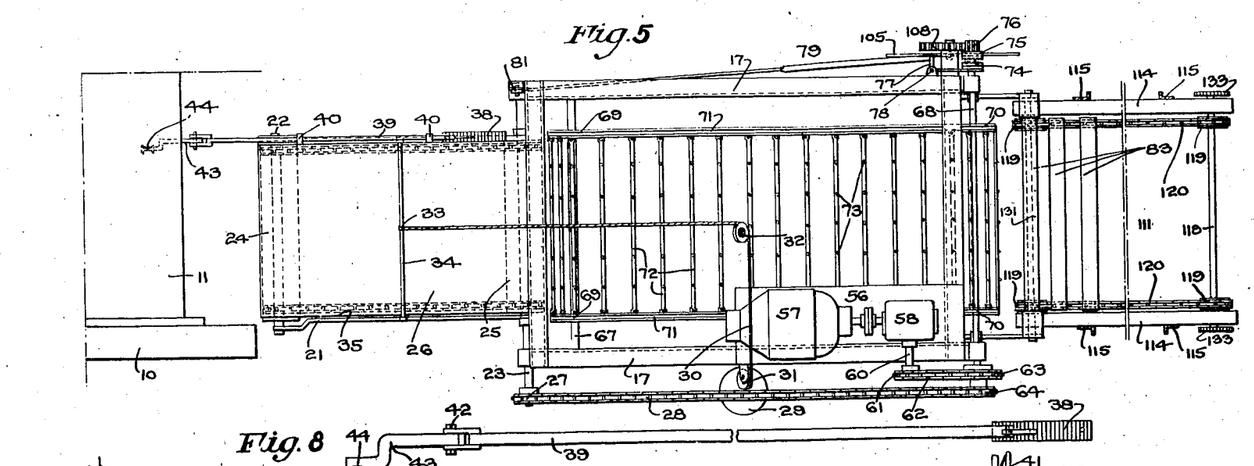
Figure 5 is a plan view of an assembly like that shown in Figure 1 wherein the conveyor unit is of somewhat modified construction.
Figures 8 and 9 are top plan and side views respectively of the knife bar and associated parts employed in stripping the stock from the mill roll.
Figure 6:
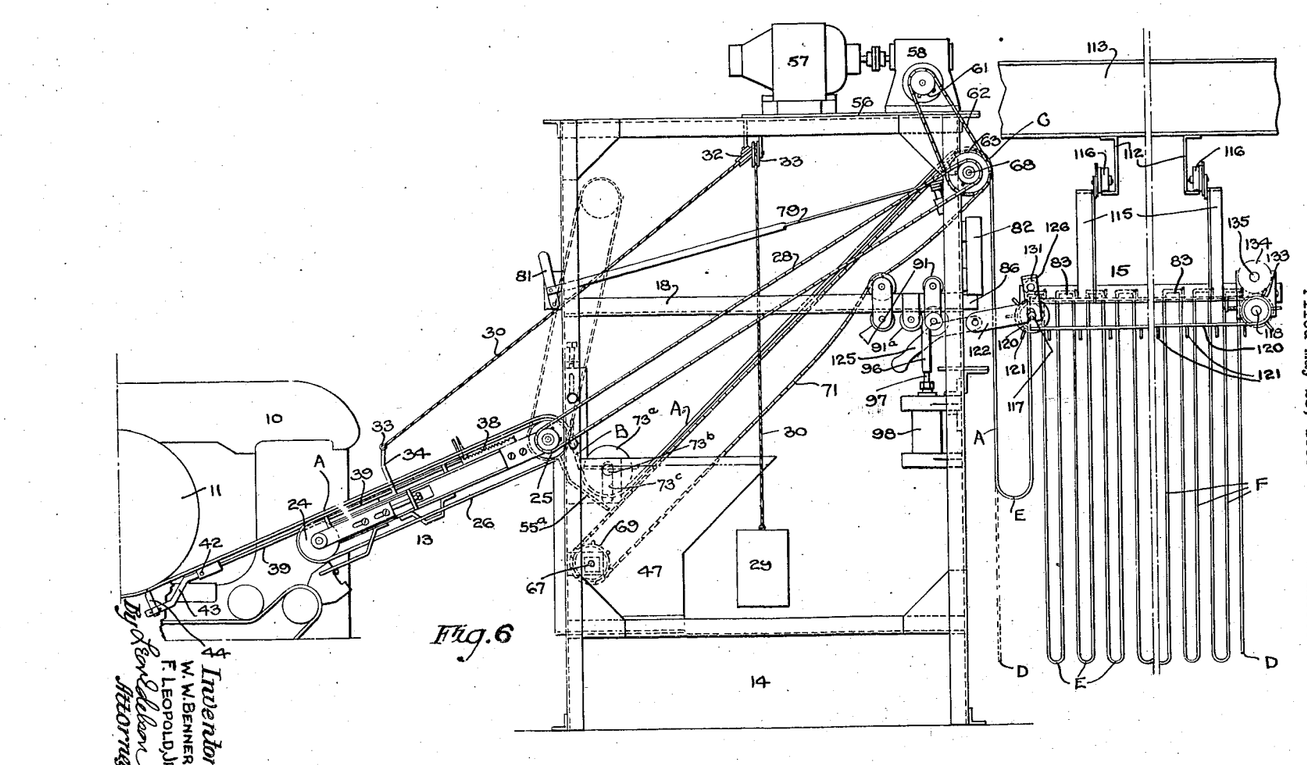
Figure 6 is a side elevational view of the assembly shown in Figure 5.

Before proceeding with the description of the remaining parts of the apparatus, it may be well to point out that instead of employing two sets of cooperating multiple chains 45 and 46, a more simplified chain conveyor of the type shown in Figures 5 and 6 may be employed. In certain instances it may be preferable to employ this latter construction of chain conveyor the use of which necessarily involves only a single pair of shafts 67 and 68 which correspond respectively to the shafts 52 and 54 of the arrangement shown in Figure 1. These are each provided at either end thereof with a pair of sprocket wheels 69—69 and 70—70, each of the forward set of sprocket wheels being connected to each of the corresponding rear sprocket wheels 70 by a sprocket chain 71. Transversely extending between and interconnecting the laterally spaced sprocket chains 71 are a plurality of spaced rods or bars 72. Preferably, each of these cross bars 72 is provided with laterally spaced pointed projections or pins 73 which engage the under surface of the stock conveyed thereon to prevent slipping or creeping of the stock as it is delivered from the solution tank 47 upwardly to where the stock is discharged from the intermediate unit 14. In addition, a freely rotatable squirrel cage 73a is suitably journalled within the tank immediately above the forward portion of the chain drive 71, this squirrel cage being carried by a shaft 73b the opposite extremities of which are respectively received within slotted guides 73c in such manner that the cage is adapted to float upon and be driven by the upper surface of the stock as the latter is fed from the belt conveyor onto the chain drive 71. The squirrel cage 73a thus serves to hold the stock down upon the upper surface of the chain conveyor 71 adjacent the stock-receiving end thereof.

In all other respects the apparatus which is shown in Figures 5 and 6 is substantially similar to that shown in Figures 1 to 4, inclusive, as will appear from the like reference numerals employed to designate similar parts of the apparatus, the sole difference between the two forms of the apparatus residing in the fact that whereas in the previously described form the stock is more or less gripped between and fed to the discharge point by cooperating sets of chains arranged to either side of the inclined plane of movement of the stock through the intermediate unit 14, in the form of apparatus shown in Figures 5 and 6 the stock rests upon the upper surface of and is conveyed by a simple form of conveyor and in which a single pair of laterally spaced sprocket chains are interconnected by a plurality of transversely extending bars or rods upon which the stock rests and is supported.

Still another modification of the intermediate conveyor for the stock which may be employed is one wherein the lower set of drive chains 46 (see Figures 1 and 2) are utilized in place of the type of conveyor shown in Figures 5 and 6. In such case, the upper set of drive chains 45 (see Figures 1 and 2) are dispensed with, but the squirrel cage 73a of Figures 5 and 6 is used. In other words, in this last-described type of conveyor, the multiple chain drive 46 of Figures 1 and 2 may be substituted for the cross-connected chain drive of Figures 5 and 6 in which event it is desirable to provide the multiple chains 46 with pointed pins or projections which engage the stock and prevent the latter from slipping from or creeping along the conveyor chains. Inasmuch as the substitution just described appears to be an obvious one, it has not been thought necessary to illustrate it in the drawings.

Reverting now to Figures 1 to 4, inclusive, it will be observed that the upper driven shaft 54 of the chain conveyor is provided with an axially shiftable clutch member 74. Preferably, this clutch member is arranged upon that end of the shaft 54 which is opposed to the chain-driven end thereof. In the form of apparatus shown in Figures 5 and 6, the said axially shiftable clutch member 74 is carried by the shaft 68. It will be understood, of course, that while the said clutch member 74 is axially shiftable along the shaft 54 (or along the shaft 68 of the Figure 5 modification) it is so splined to the shaft as to be rotatable therewith. Freely rotatable upon the same shaft is a cooperating clutch member 75 with which is associated a pinion gear 76 from which it will appear that as the clutch member 74 is shifted axially into engagement with the clutch member 75, the pinion gear 76 will be caused to rotate together with the shaft 54 or with the shaft 68 of Figure 5, as the case may be. In order to effect the desired connection and disconnection between the clutch members 74 and 75, there is provided a clutch-shifting mechanism which includes a bell crank lever 77 which is pivotally secured to the skeleton frame 14, as at 78. One branch of this bell crank lever 77 is in the form of a yoke adapted to engage the axially shiftable clutch member 74 while the opposite branch thereof is loosely connected to an operating arm 79 which extends forwardly and downwardly along one side of the skeleton frame 14 to the point 80 where it is provided with an operating handle 81. It will thus be observed that when the operator pulls the operating arm 79 forwardly the clutch members 74 and 75 are caused to engage in such manner as to effect the operation of the pinion gear 76.

Secured to the rearwardly facing surface of each of the rear vertical members 16 of the skeleton frame 14 is a vertically disposed channel member 82, these channel members 82—82 being disposed with the mouths thereof presenting toward each other to provide in effect a pair of laterally spaced parallel guides within which are adapted to be respectively accommodated the opposite ends of a plurality of flat bars 83. As appears most clearly in Figure 4, these bars are stacked one upon another in flatwise relation. Also as appears most clearly in this figure, the outer walls of the channel members 82—82 are each notched at their lower extremities, as at 84, to a depth and height sufficient to permit the bars 83 to be bodily projected rearwardly from within the bar-receiving channels one at a time. The notches 84—84 are located substantially in the horizontal plane of the lowermost bar 83 from which it will be apparent that as one bar is propelled outwardly with respect to the remaining bars of the stack, it is immediately replaced by the next higher bar, and so on, the lowermost bar of the stack being constantly shifted by the weight of the stack of superposed bars into the horizontal plane of the notches 84—84. Preferably, the bottom ends of the channels 82—82 are closed by plates 85—85 each of a width somewhat greater than the depth of the channel, these plates projecting inwardly toward each other to provide opposed end supports for the stack of superposed bars 83. From the foregoing, it will be evident that the channel members 82—82 conjointly serve as a magazine or the like from which the bars 83 may be successively propelled in the manner and by the means presently to be described. It will be noted that the horizontal plane of propulsion of the bars 83 from the magazine in which they are stacked lies substantially in the horizontal plane of the upper surfaces of the pair of longitudinally extending members 18 of the skeleton frame. These frame members 18—18, which are respectively disposed substantially beneath the opposite marginal edges of the chain conveyor of the intermediate unit 14, serve as supports for the guide rollers between which are movable a pair of longitudinally shiftable pusher bars 86—86 of the character best shown in Figure 14. Each of these pusher bars 86 is provided with a spring-pressed detent 87 in its outer extremity and with a series of rack teeth 88 in its bottom surface. As appears most clearly in Figure 14, the detent 87, which is pivoted within a recess 89 provided in the pusher bar, is normally retracted by its spring 90 into a position substantially perpendicular to the upper surface of the pusher bar. The rear upper corners of the detents are beveled or chamfered, as at 91a, so that when the detents assume angularly inclined positions (against the action of the springs 90) the free edges of the detents are respectively disposed flush with the upper surfaces of the pusher bars 86.

Figures 3, 14, 15:
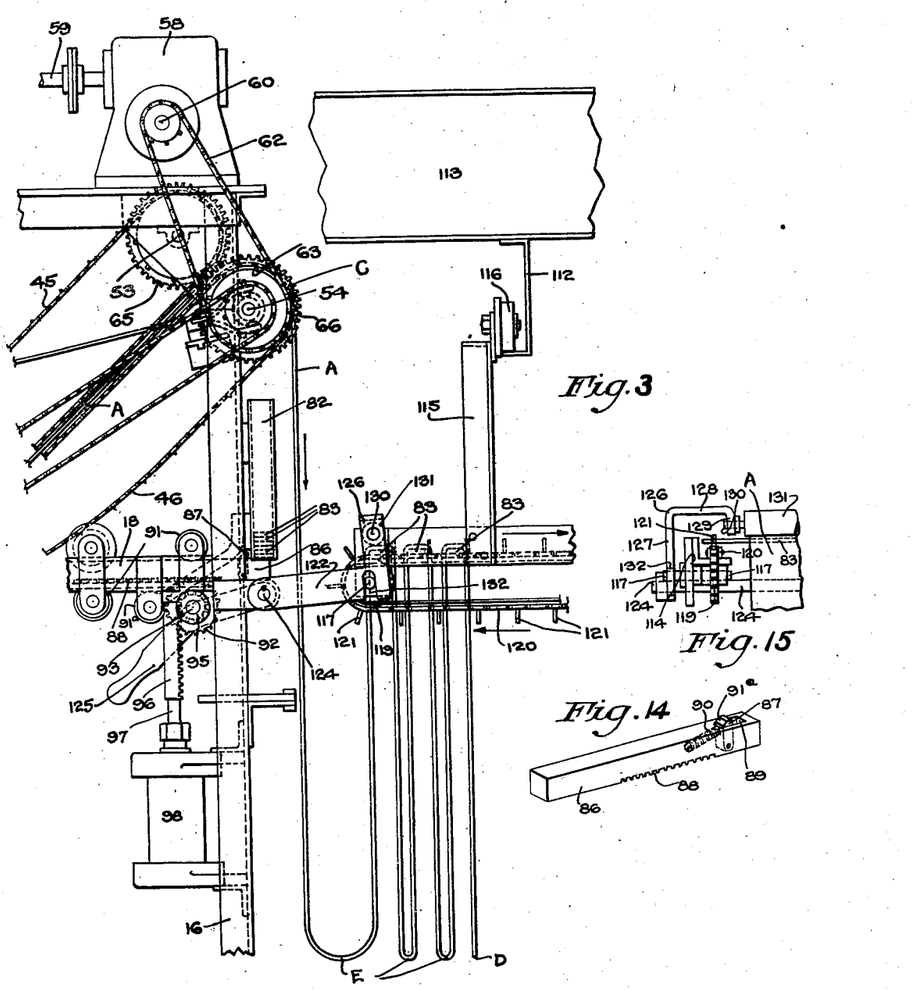
Figure 3 is an enlarged side elevational view of the immediately adjoining parts of the stock conveyor unit and the stock suspending unit.
Figure 14 is a perspective view of one of the pusher bars.
Figure 15 is a view of the mechanism employed for interlocking the conveyor unit to the stock suspending unit.
Figures 4, 7:
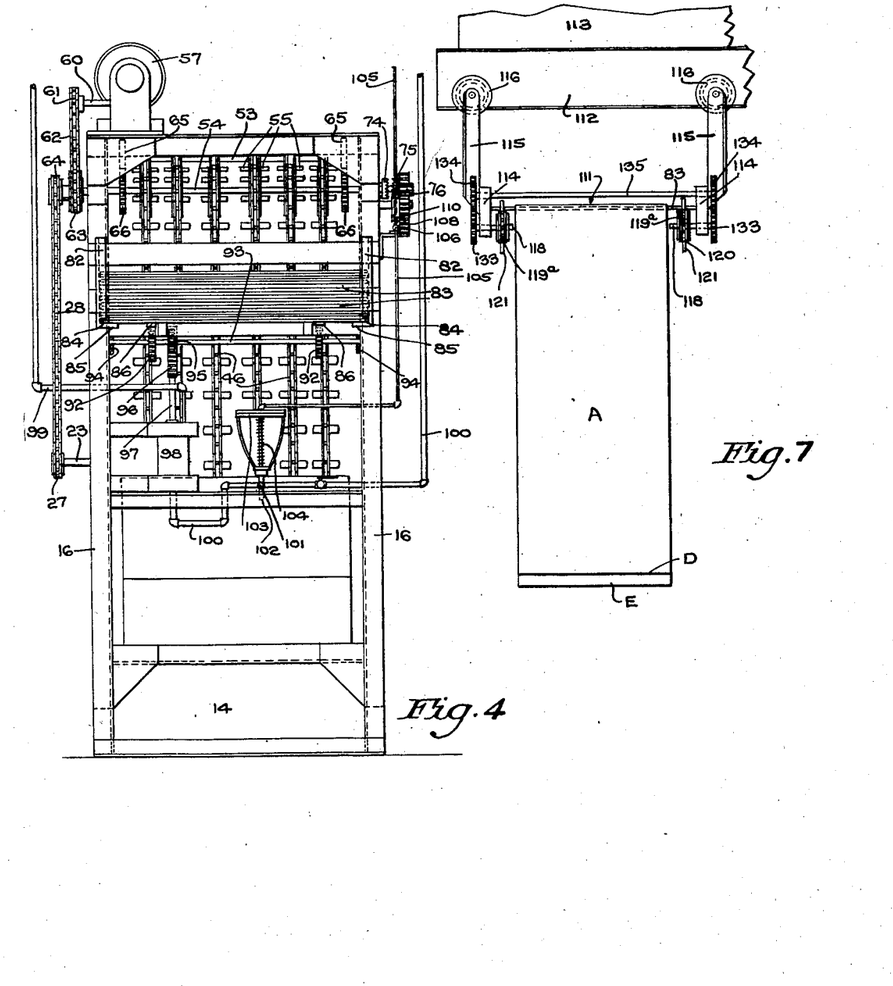
Figure 4 is a rear elevational view of the conveyor unit.
Figure 7 is a rear elevational view of the laterally shiftable stock supporting unit of the apparatus.

In their normal inoperative positions the pusher bars 86—86 are disposed as shown in Figures 1 and 3 wherein it will be observed that the outer extremities of these bars immediately underlie the vertical stack of bars 83 contained within the magazine 82—82. In this position of the pusher bars the spring-pressed detents 87 thereof are each in their normally retracted conditions and so located that as the pusher bars are shifted longitudinally in a direction rearwardly of the machine they engage the lowermost one of the stacked bars 83 and carry it rearwardly and out of the magazine 82—82 to a point well beyond the rear of the intermediate unit 14. On the return stroke of the pusher bars 86—86, after having deposited the flat bar 83 upon the festooning unit 15 in the manner and by the means to be presently described, the detents 87 thereof engage and ride freely beneath the bottom of the stack of bars 83 without disturbing the latter, whereupon the detents re-assume their bar-engaging positions preliminarily to projecting another of the bars 83 to and upon the festooning unit 15.

It will be understood, of course, that any suitable means may be employed for guiding the pusher bars 86—86 along parallel, rectilinear paths of movement and for preventing their relative displacements from such fixed paths of movements. Preferably, this means may be in the form of a plurality of vertically spaced rollers 91—91 suitably mounted upon each of the frame members 18 and by which the pusher bars 86—86 are restrained against all but a horizontal movement.

The mechanism for automatically effecting the operation of these pusher bars 86—86 will now be described. Essentially this mechanism includes a pair of gears 92—92 the teeth of which respectively engage the toothed under surfaces 88—88 of the pusher bars. These gears 92—92 are commonly keyed upon a transversely extending shaft 93 which is suitably journaled within laterally spaced bearing members 94—94 secured to the frame of the intermediate unit 14. Also keyed to the gear shaft 93, preferably at a point between the gears 92—92, is a pinion gear 95 which is in constant mesh with a vertically reciprocable rack 96. This rack 96 is in the form of a vertical extension of the piston rod 97 of a cylinder-and-piston unit 98 which is rigidly mounted upon the skeleton frame of the intermediate unit. A roller 91a or any other suitable means may be employed for maintaining the rack 96 constantly in mesh with its operating pinion 95. Preferably, the unit 98 and its immediately associated parts are located upon the side of the machine opposite to that upon which the operator is stationed.

The cylinder unit 98, which is preferably designed for pneumatic operation although other pressure medium may be employed as desired, is of the double-acting type in which the upper surface of the piston is subjected to a constant pressure of twenty pounds, while the lower surface thereof is intermittently subjected to a greater pressure, such as, for example, one hundred pounds. As appears most clearly in Figure 13, the upper head pressure of twenty pounds is supplied to the cylinder from a suitable source of pressure supply (not shown) by way of the conduit 99, while the lower head pressure of one hundred pounds is supplied to the cylinder from a suitable source of pressure supply (also not shown) by way of the conduit 100 in which is included an automatically operated 3-way valve 101. A discharge conduit 102 is connected to the exhaust port of the valve 101 whereby the high-pressure side of the cylinder 98 may be exhausted upon the completion of the upward stroke of its piston and so permit the latter to be returned into its lowermost position under the influence of the constant low-pressure operating medium.

Figures 2, 11, 12, 13:
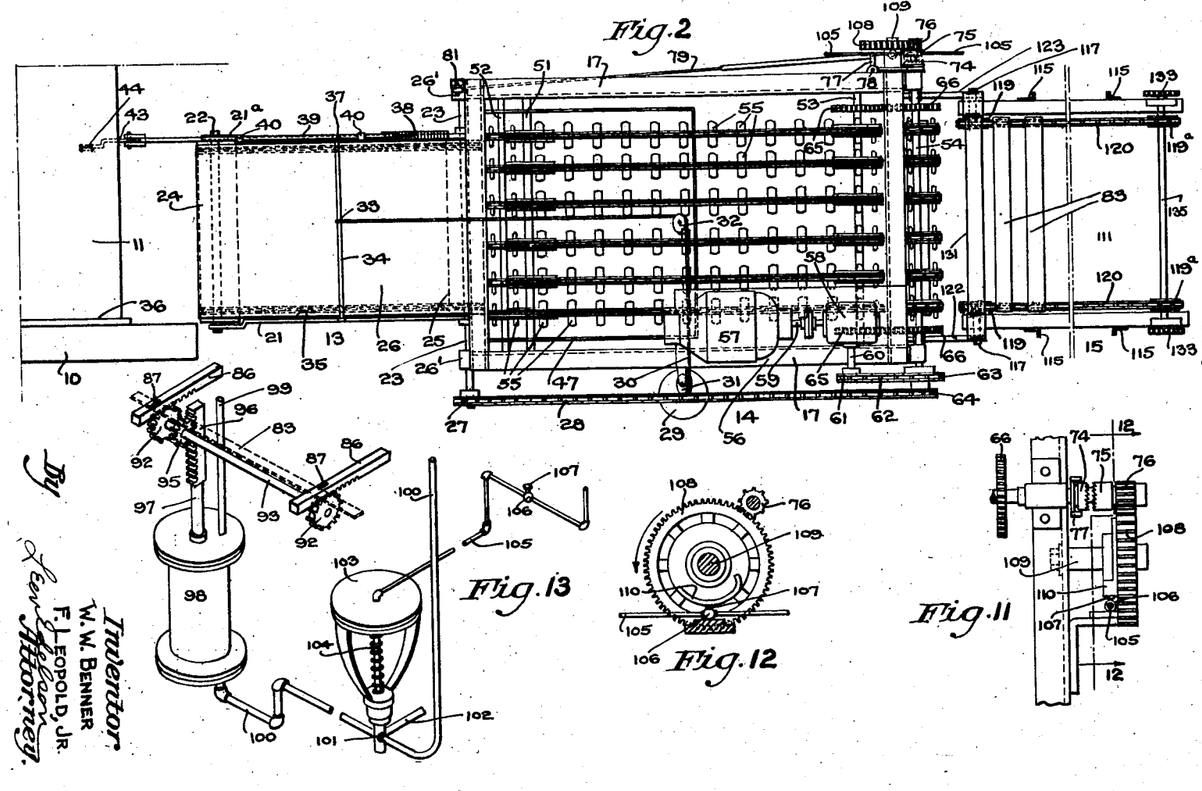
Figure 2 is a top plan view of the assembly shown in Figure 1.
Figure 11 is a rear elevational view of a detail of the machine showing the timing gear and clutch assemblies thereof.
Figure 12 is a view taken substantially on the line 12—12 of Figure 11.
Figure 13 is a diagrammatic view showing the means for intermittently actuating the pusher bars for effecting engagement between the stock and its supporting bars.

Operatively associated with the 3-way valve 101 is a diaphragm valve 103 of any conventional form and which preferably includes a spring-pressed diaphragm (not shown) carrying a valve actuating rod 104. A conduit 105 delivers a suitable pressure fluid to the diaphragm in such manner that as the latter is deflected under the influence of the pressure medium the valve 101 is opened to supply the high pressure fluid to the cylinder unit 98 to cause the rack 96 to move upwardly. Upon interruption of the supply of fluid to the diaphragm the spring-pressed rod 104 operates to close the valve 101 and at the same time open its exhaust port, whereupon the cylinder unit 98 is caused to operate in the reverse direction, the rack 96 being then caused to move downwardly. Preferably but not necessarily, the conduit 105 is connected to the same source of pressure supply as is the conduit 99.

In order to effect the desired alternate opening and closing of the 3-way valve 101, the supply of pressure fluid to the diaphragm valve 103 is intermittently interrupted by a cam-actuated valve 106 included in the conduit 105 and having a spring-pressed operating button or head 107. The cam mechanism for actuating the valve 106 is operatively associated with the clutch mechanism 74—75—76 hereinbefore described and includes a gear 108 which is constantly in mesh with the pinion 76. As appears most clearly in Figures 11 and 12, this gear 108, which is journaled upon a stub shaft 109 fixed to the skeleton frame of the intermediate unit 14, is provided upon the inner surface thereof with a cam shoe 110 the external surface of which is adapted to ride over and depress the button 107 of the valve 106. The latter valve is so disposed in the path of the cam 110 that for each revolution of the gear 108 in the direction of the arrow shown in Figure 12 the valve button 107 is depressed once and so maintained for an interval of time sufficient to effect the completion of the upward stroke of the piston-actuated rack 96. The vertical reciprocation of the rack 96 is effected, of course, only so long as the clutch members 74—75 are interengaged in the manner and by the means hereinbefore described.

From the foregoing it will be apparent that upon engaging the clutch members 74—75, the piston unit 98 is intermittently supplied with pressure operated fluid to effect a vertical reciprocation of the rack 96 which latter, in turn, operates upon the pinion gear 95 to rotate the shaft 93 alternately in opposite directions. As a consequence of this alternate rotation of the shaft 93, the gears 92—92 respectively act upon the pusher bars 86—86 to cause the latter to reciprocate longitudinally in a substantially horizontal plane, thereby successively propelling the several stock-suspending bars 83 rearwardly of their magazine and toward and upon the festooning unit 15. This latter unit will now be described.

As appears most clearly in Figures 1, 2 and 3 (as well as in Figures 5 and 6), this latter unit comprises a carriage designated generally by the reference numeral 111 which is suspended from an overhead track arrangement along which the carriage is movable laterally to either side of the intermediate stock delivering unit 14. The parallel tracks 112—112 are supported upon an overhead beam 113 or the like and extend transversely of and for a substantial distance to either side of the intermediate unit. The carriage 111 comprises a pair of laterally spaced longitudinally extending side frame members 114—114 suitably connected together to provide a rigid frame of rectangular outline adapted for disposition in a substantially horizontal plane. Secured to each of the opposite side members of this horizontally disposed frame are a pair of vertical suspension members 115—115 the upper ends of which are each provided with a suitably journalled trolley wheel 116, the opposed pairs of trolley wheels being adapted, respectively, to ride along the tracks 112—112.

Extending transversely of the horizontally disposed carriage frame members 114 at the fore ends thereof are a pair of oppositely projecting stub shafts 117, while a corresponding pair of stub shafts 118 project oppositely from the carriage frame at the rear end thereof. Each of these stub shafts 117 and 118 is provided with a sprocket wheel, the forward pair of sprocket wheels 119—119 being freely journaled upon their respective stub shafts 117, while the rear pair of sprocket wheels 119a—119a are keyed to their respective stub shafts 118. Operatively associated with each pair of fore and rear sprocket wheels is an endless sprocket chain 120, the relative arrangement being such that the pair of sprocket chains 120—120 are adapted to travel in substantially vertically disposed planes spaced apart a distance slightly greater than the width of the stock stripped from the mixing mill roll 11. Each of these sprocket chains 120—120 is provided with a plurality of longitudinally spaced externally projecting dogs or pins 121, the spacing between successive pairs of which is greater than the width of each of the bars 83 which are adapted to be respectively accommodated between each successive pair of the said pins.

More specifically, the spacing between successive pairs of the pins 121 is such that when the stock-suspending bars 83 are received therebetween sufficient clearance is provided between the bars to maintain the festooned sections of the stock suspended therefrom in such spaced relation as to insure an adequate circulation of cooling air between the suspended sections of the stock.

As appears most clearly in Figures 1, 3 and 6, the sprocket chains 120—120 are so arranged that their upper sections travel substantially in a horizontal plane disposed slightly above the bottom of the stack of bars 83 contained within the magazine 82—82. Moreover, the carriage 111 is adapted to be relatively so positioned with respect to the intermediate unit 14 that as the bars 83 are successively projected outwardly from their magazine 82—82 by the action of the pusher bars 86 they are successively received by the sprocket chains 120 of the carriage 111. As appears most clearly in Figures 2, 5 and 7, the carriage 111 is so aligned with the intermediate unit 14 that as the said bars are projected from their magazine the opposite ends thereof respectively rest upon the opposed sprocket chains 120—120 and are maintained in the transversely extending substantially parallel relation shown in these figures by the dogs or pins 121.

It will be understood that it is desirable to employ at least two of the laterally movable festooning units 15 for each apparatus so that when one of these units receives its full load of the stock discharged from the intermediate unit 14, it may be shifted laterally of the latter unit along the overhead tracks 112, thereby permitting a second festooning unit to be moved into the position vacated by the first unit. Thus, by so successively employing two or more festooning units in connection with each apparatus, the mixing mill may be operated without any substantial interruption. If desired, of course, the tracks 112—112 may extend to any desired point removed from the mixing mill so that when a particular festooning unit becomes fully loaded with the stock discharged from the intermediate unit 14 it may be conveyed to that remote point for subsequent operations upon or handling of the stock.

During the operation of loading the stock upon festooning unit 15, the carriage 111 of the latter must necessarily be rigidly maintained in fixed position relatively to the intermediate unit 14. The means for so interlocking the units 14 and 15 will now be described, this means being shown most clearly in Figures 1, 2, 3 and 15.

Essentially, this interlocking mechanism comprises a pair of laterally spaced arms 122—123, these arms being respectively keyed to the opposite ends of a transversely extending shaft 124 suitably journaled upon the skeleton frame of the intermediate unit. Preferably, the arm 123 is provided with a rearwardly extending operating extension or arm 125 by means of which the shaft 124 may be oscillated to raise or lower the said arms 122—123. The rear free extremities of these arms 122 and 123 are respectively provided with integrally formed terminal members 126, each of which is of substantially inverted J-form having the angularly related branches 127, 128 and 129 (see more particularly Figure 15). The branches 128—128 extend inwardly and toward each other in such manner as to present the terminal branches 129—129 in substantially vertically disposed parallel relation. Extending transversely between the journaled side branches 129—129 is a shaft 130 upon which is rotatably journaled an idler weight roll 131. If desired, the roll 131 may be keyed to the shaft 130 in which event the opposite extremities of the latter are journaled for free rotation within the branches 129 of the opposed terminal members 126. Respectively formed in the outer extremities of the arms 122—123 are a pair of notches 132, these notches being extended upwardly from the bottom edges of the said arms 122 and 123. These notches 132—132 are respectively adapted to receive the oppositely projecting extensions of the forward shaft 117 of the festooning carriage 111 when the said arms 122—123 are swung into the position shown most clearly in Figure 3. In this interlocking position of the arms 122 and 123, it will be observed that the movable carriage 111 of the festooning unit 15 is maintained in relatively fixed position with respect to the intermediate unit 14 and is restrained against any movement along the tracks 112 laterally of the latter unit. Also, it will be observed that when the arms 122—123 interengage the oppositely projecting extensions of the forward shaft 117 of the suspended carriage 111 the idler roll 131, which is rotatably journaled between the terminal members 126—126 of the said interlocking arms, is located immediately above and substantially in the vertical plane of the shaft 117.

Preferably, in order to insure a synchronized operation of the laterally spaced sprocket chains 120 of the movable carriage 111, the rear sprocket wheel shaft 118 is provided at either extremity thereof with a gear 133. These laterally spaced gears 133—133 are respectively in mesh with a second pair of gears 134 which are fixed to for rotation with the shaft 135 spaced vertically above the shaft 118. By means of these interengaging gears 133—134 arranged at either side of the movable carriage 111, it will be apparent that neither one of the endless sprocket chains 120 can move independently of the other sprocket chain. This synchronized operation of these sprocket chains 120—120 insures that the several pins 121 of one chain are respectively aligned with those of the opposite chain, in consequence of which the stock suspending bars 83 which are carried by and extend between the upper sections of the sprocket chains 120—120 are at all times maintained in substantially parallel relation and substantially at right angles to the direction of their movement rearwardly of the apparatus.

In the operation of the apparatus as just described, the stock is removed from the roll 11 of the mixing mill in the form of a continuous strip of substantially uniform width. The width of the strip is governed by the location of the knife 44 which severs the stock covering the surface of the roll 11 along a line extending circumferentially about the said roll. The strip so removed from the surface of the roll 11 is designated in the drawings by the reference numeral A in which it will be observed that the said strip A is initially delivered to and fed by the belt conveyor 26 along an inclined path to the discharge end of this belt conveyor. The strip A so discharged from the upper end of the belt conveyor 26 is then fed downwardly, as at B, and thence is guided rearwardly by the stock guide plate 55a onto the conveyor chain or drive of the intermediate unit, the lower portion of which latter is submerged in the tank 47 containing the soapstone mixture. This is shown most clearly in Figures 1 and 6. In the form of the apparatus shown in Figure 1, the strip A is then delivered upwardly out of the said tank 47 between the upper and lower sets of conveyor chains 45 and 46. In the form of the apparatus shown in Figure 5 the strip is similarly fed upwardly out of the tank 47 along an upwardly inclined path by means of the single type conveyor 71. In both forms of the apparatus the strip A is discharged from the intermediate unit 14 substantially at the point C from whence the strip is permitted to drop downwardly to a point well below the bottom of the bar magazine 82—82 in which are vertically stacked the separately and successively removable bars 83.

It will be understood, of course, that before the strip A is thus fed through the apparatus from the roll 11 of the mixing mill, the festooning unit 15 is operatively locked to the intermediate unit 14 in the manner and by the means hereinbefore described. Also, the operator of the apparatus does not effect the interengagement of the clutch members 74—75 until the leading end of the strip A reaches a predetermined point below the horizontal plane of the pusher bars 86—86. This initial position of the freely suspended leading section of the strip A is shown by the dotted lines of Figures 1 and 6 wherein the leading end of the strip is designated by the reference character D.

When the leading end of the strip A reaches the initial level shown in Figures 1 and 6, the operator pulls the arm 79 forwardly and so effects interengagement of the clutch members 74 and 75. The cam gear 108 is thereby thrown into operation in consequence of which the cam shoe 110 thereof intermittently operates upon the button 107 of the valve 106 whereby the latter is alternating opened and closed. This alternating opening and closing of the valve 106 in turn effects the alternate opening and closing of the main valve 101 which controls the supply of high pressure fluid through the conduit 100 to the high pressure side of the cylinder-and-piston unit 98. Inasmuch as the operation of the said cylinder-and-piston unit insofar as it relates to the actuation of the pusher bars 86—86 has been previously described, it is not thought necessary to repeat this description at this point, it being deemed sufficient merely to note that for each rotation of the cam gear 108, the pusher bars 86—86 are simultaneously shifted longitudinally in a direction and for a distance sufficient to project the lowermost bar 83 rearwardly of the vertical stack of such bars onto the sprocket chains 120 of the festooning carriage 111.

As has been previously stated, the opposite extremities of the bar 83 so projected from the bottom of the magazine 82 are respectively received between a pair of successive pins 121 extending perpendicularly to the orbit of movement of the sprocket chains. The extent to which the bars 83 are successively projected out of the bottom of their magazine 82—82 upon the sprocket chains 120—120 is sufficient to cause the latter to shift in the direction of the arrow shown in Figure 3, this shifting being effected, of course, by the engagement of the bars 83 successively with the dogs 121 carried by the chains 120.

With the foregoing in mind, it will be apparent that when the strip of stock A is suspended in its dotted line positions shown in Figures 1 and 6 and the initial bar 83 is projected outwardly of the magazine, the said bar is necessarily caused to traverse the vertical plane of the suspended strip of the stock and so causes the latter to shift into a position between the sprocket chains 120—120, the extent of this shifting movement being limited by the degree of longitudinal movement of the pusher bars 86—86 upon which the said bar 83 is supported during its movement from the magazine 82 to and upon the sprocket chains 120—120.

As the said initial bar 83 is rested upon the sprocket chains 120—120, the stock is engaged by the idler weight roll 131 and is momentarily held in stationary position by the latter. At the same time, the pusher bars 86—86 are withdrawn into their fully retracted position, in which position they remain until the valve 105 is again actuated by the cam shoe 110 of the cam gear 108. During all of this operation, the strip of stock A is, of course, being fed continuously through the intermediate unit 14 of the apparatus. In consequence of this the section of the stock immediately behind the point thereof which is supported by the bar 83 then resting upon the sprocket chains 120—120 of the carriage 111 is caused to loop upon itself. As the stock continues to be discharged from the intermediate unit the looped section gradually increases in depth until the bight E thereof reaches a level approximately the same as that initially assumed by the leading end D of the strip. In Figures 1 and 6 the last of these looped sections of the stock is shown only partially formed, in consequence of which its bight E is somewhat above those of the completely looped sections F previously formed. During the formation of these looped sections, the idler weight roll 131 serves the important function of coacting with each successively projected bar 83 to clampingly engage and retain the stock against movement relatively to the last projected bar, the retention of the stock in this manner being effected for a period sufficient to complete the formation of each newly looped section so that the weight of the latter counterbalances that of the looped section suspended upon the stock-receiving unit.

It will be apparent from the foregoing that as the sheet of stock which emerges from the conveyor of the intermediate unit 14 at the point C reaches a predetermined length, one of the bars 83 is projected outwardly from the magazine 82—82 in such manner as to impinge against and carry the suspended sheet of the stock onto the sprocket chains 120—120. Also, it will be apparent that as each of the bars 83 which are successively projected from their magazine into engagement with the freely depending section of the stock is received by the sprocket chains 120—120 of the carriage 111, they cause the said sprocket chains to move sufficiently to advance step by step the successively formed looped sections of the stock. In this manner there is eventually formed a series of longitudinally spaced looped sections F of the stock which are supported in festooned condition from the several bars 83 extending transversely across the upper sections of the sprocket chains 120—120. By changing the gear ratio between the cam gear 108 and the pinion 76, it will be understood that the intervals elapsing between successive projections of the festooning bars 83 onto the sprocket chains 120—120 may be so varied as to provide for longer or shorter length looped sections F of the stock. The cam gear 108 may therefore be considered as a timing gear for timing the operation of the pusher bars 86—86.

When the upper horizontally disposed sections of the sprocket chains 120—120 of the carriage 111 have received their full quota of the festooning bars 83, the clutch members 74—75 are immediately disengaged, whereupon the pusher bars 86—86 are rendered ineffective to project any further bars 83 outwardly of the magazine 82—82. The interlocking members 122—123 are then thrown upwardly to disconnect the units 14 and 15 of the apparatus, whereupon the latter is free to be moved laterally to one side or the other of the intermediate unit 14. It will be understood further that as the loaded unit 15 is shifted laterally of the intermediate unit 14 of the apparatus a second unit may be shifted into the position formerly occupied by the loaded unit and then locked to the intermediate unit 14 for reception of a second load of the stock.

The stock which is supported in festooned condition upon the carriage 111 which has been shifted to one side of the apparatus is permitted to cool while in this latter position preliminarily to the operation of removing the stock from the carriage. This latter operation is effected most expeditiously by slitting each looped section longitudinally of their respective bight extremities E thereof, thereby leaving suspended upon each of the bars 83 a plurality of doubled sections of the stock. Each of these doubled sections may then be readily removed from the carriage 111 by the simple expedient of lifting each bar 83 bodily out of engagement with the sprocket chains 120—120, following which the bars 83 are again stacked in vertical relation within the magazine 82—82.

Obviously, the invention is subject to various other changes and modifications without departing from the general principles or real spirit of the invention and accordingly it is intended, in the appended claims, to define the invention broadly as well as specifically.

What is claimed as new and useful is:—

1. In an apparatus of the character described, in combination, a conveying mechanism arranged to continuously convey a relatively long strip of stock to a predeterminedly located point of discharge, a stock receiving unit shiftable laterally to either side of the path of movement of the strip of stock, means for locking said unit in position to receive the strip of stock discharged from the conveying mechanism, and means operative automatically to shift successive portions of the stock discharged from the conveying mechanism to and upon the said stock receiving unit, said last-mentioned means being operative to arrange the successive portions of the stock so shifted upon the receiving unit therefor in the form of a series of longitudinally spaced similarly formed looped sections.

2. In an apparatus of the character described, a conveying mechanism for continuously conveying a single length of stock of substantially uniform width to a discharge point elevated above the floor line of the apparatus from whence the discharged portions of the stock are adapted to depend in a substantially vertically disposed plane, a plurality of vertically stacked, transversely extending bars disposed immediately to the rear of the said vertical plane of the depending section of the discharged stock, means operative automatically in accordance with a predetermined time sequence to successively propel the said bars in a horizontal plane and in a direction normal to the vertical plane aforesaid whereby successively discharged portions of the stock are respectively shifted out of the vertical plane aforesaid into another plane substantially parallel thereto, and a laterally shiftable stock-receiving unit onto which said bars are successively shifted for supporting the stock in festooned condition.

3. In an apparatus for handling rubber stock and the like delivered in the form of a single length strip of substantially uniform width to a predeterminedly located point from whence successive portions thereof are successively presented in the same vertical plane, means automatically operative upon the said successively-presented portions of the strip of stock to arrange the latter in festooned condition, and means for supporting the festooned stock, said last-mentioned means including a movable carriage suspended from an overhead track upon which the carriage may be shifted laterally to one side or the other of the stock conveying means.

4. In an apparatus of the character described, in combination, means for presenting in substantially the same vertical planes successive portions of a continuously moving strip of stock, a laterally shiftable stock receiving unit including a pair of laterally spaced chains arranged for synchronous movement, a plurality of stock engaging members adapted to be successively projected across the said vertical plane to and upon the said chains between which the said bars are respectively supported in transversely extending, substantially parallel relation, and means provided upon each of said chains against which the said bars impinge and which operate to maintain the bars in the relationship aforesaid and to cause the said chains to intermittently advance whereby to permit the latter to accommodate a plurality of said bars.

5. In an apparatus of the character described, in combination, means for presenting in substantially the same vertical plane successive portions of a continuously moving strip of stock, a stock receiving unit including a pair of laterally spaced chains arranged for synchronous movement, a plurality of stock engaging members adapted to be successively projected across the said vertical plane to and upon the said chains between which the said bars are respectively supported in transversely extending, substantially parallel relation, means provided upon each of said chains against which the said bars impinge and which operate to maintain the bars in the relationship aforesaid and to cause the said chains to intermittently advance whereby to permit the latter to accommodate a plurality of said bars, and means positioned immediately above and extending transversely between the extremities of said chains to interrupt the forward shifting of the successively projected portions of the stock forwardly of the vertical plane aforesaid whereby to effect a doubling of each of said successively discharged portions of the stock.

6. An apparatus for handling strip rubber stock and the like comprising, in combination, means for continuously presenting successive portions of the stock in the same vertical plane, means operative automatically and in accordance with a predetermined time sequence to fold each of said portions upon itself, laterally shiftable means for successively receiving in freely suspended condition each of said folded portions of the stock, and means for progressively shifting the initially folded portions along the receiving means therefor to provide accommodation thereon for each subsequently formed portion.

7. An apparatus for handling strip rubber stock and the like comprising, in combination, means for continuously presenting successive portions of the stock in the same vertical plane, means operative automatically and in accordance with a predetermined time sequence to fold each of said portions upon itself, means for successively receiving in freely suspended condition each of said folded portions of the stock, means for progressively shifting the initially folded portions along the receiving means therefor to provide accommodation thereon for each subsequently formed portion, and means whereby said stock-receiving means may be shifted laterally of the marginal limits of the strip of stock when the latter means has received its full quota of folded portions.

8. In an apparatus for handling a continuous strip of rubber stock delivered to an elevated point from whence it is discharged in freely suspended condition, in combination, a plurality of pneumatically actuated pusher bars successively operative automatically to engage and cause successive freely suspended sections of the strip to be doubled upon itself, and means operative to temporarily clamp in stationary suspended position each of the said doubled sections for an interval of time sufficient to permit a succeeding section to be doubled upon itself.

9. In an apparatus for handling a continuous strip of rubber stock delivered to an elevated point from whence it is discharged in freely suspended condition, in combination, a plurality of vertically stacked bars disposed to one side of the suspended strip, pneumatically actuated means adapted to successively propel said bars across the vertical plane of the strip whereby to engage and cause the successive freely suspended sections of the strip to be doubled upon themselves, and a laterally shiftable endless conveyor disposed to the opposite side of the suspended strip for receiving the successively propelled bars and for maintaining in suspended relation the successively looped sections of the stock.

10. In an apparatus for handling a continuous strip of rubber stock delivered to an elevated point from whence it is discharged in freely suspended condition, in combination, a plurality of vertically stacked bars disposed to one side of the suspended strip, pneumatically actuated means for successively propelling said bars across the vertical plane of the strip whereby to engage and cause the successive freely suspended sections of the strip to be doubled upon themselves, and a laterally shiftable endless conveyor disposed to the opposite side of the suspended strip for receiving the successively propelled bars and for maintaining in suspended relation the successively looped sections of the stock, said endless conveyor being intermittently shifted along its orbit of travel upon successive engagement thereof by said bars.

WINTHROP W. BENNER.
FREDERICK LEOPOLD, Jr.